(12) United States Patent
Sun et al.

(10) Patent No.: US 11,372,213 B2
(45) Date of Patent: Jun. 28, 2022

(54) CAMERA OPTICAL LENS INCLUDING FIVE LENSES OF +−+− REFRACTIVE POWERS

(71) Applicant: AAC Optics Solutions Pte. Ltd., Singapore (SG)

(72) Inventors: Wen Sun, Shenzhen (CN); Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 447 days.

(21) Appl. No.: 16/705,261

(22) Filed: Dec. 6, 2019

(65) Prior Publication Data
US 2020/0209591 A1 Jul. 2, 2020

(30) Foreign Application Priority Data
Dec. 30, 2018 (CN) .......................... 201811645897.8

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ............... G02B 13/0045; G02B 9/60
See application file for complete search history.

(56) References Cited

U.S. PATENT DOCUMENTS

2016/0062085 A1* 3/2016 Hsu .................... G02B 13/0045
359/714

FOREIGN PATENT DOCUMENTS

CN 106802467 A1 6/2017

OTHER PUBLICATIONS

PCT search report dated Jan. 31, 2020 by SIPO in related PCT Patent Application No. PCT/CN2019/114039 (5 Pages).
PCT written comments dated Jan. 31, 2020 by SIPO in related PCT Patent Application No. PCT/CN2019/114039 (4 Pages).

* cited by examiner

*Primary Examiner* — Wen Huang
(74) *Attorney, Agent, or Firm* — W&G Law Group

(57) ABSTRACT

The present application relates to the optical lens technical field and discloses a camera optical lens including, from an object side to an image side: an aperture, and a first, second, third, fourth and fifth lenses, each lens having, in sequence, a positive, negative, negative, positive and negative refractive power respectively. The camera optical lens satisfies following conditions: $1.00 \le f1/f \le 1.10$; $0.40 \le f4/f \le 0.60$; and $11.00 \le R9/R10 \le 12.00$; where mm denotes a unit of a focal length; f denotes a focal length of the camera optical lens; f1 denotes a focal length of the first lens; f4 denotes a focal length of the fourth lens; R9 denotes a curvature radius of an object-side surface of the fifth lens; and R10 denotes a curvature radius of an image-side surface of the fifth lens. The camera optical lens both has good optical performance and meets a design requirement of big aperture, ultra-thinness and wide angle.

2 Claims, 9 Drawing Sheets

CAMERA OPTICAL LENS INCLUDING FIVE LENSES OF +−+− REFRACTIVE POWERS

TECHNICAL FIELD

The present disclosure relates to the field of optical lens, in particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a three-piece or four-piece lens structure. However, with the development of technology and the increase of the diverse demands of users, and as the pixel area of photosensitive devices is becoming smaller and smaller and the requirement of the system on the imaging quality is improving constantly, the five-piece lens structure gradually appears in lens designs. A common five-piece lens has good optical performance, but its refractive power, distances between lenses and its lens shape arrangement are unreasonable to some extent, rendering that the lens structure fails to meet a design requirement of big aperture, ultra-thinness and wide angle.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can still be implemented.

Embodiment 1

Figure 1:
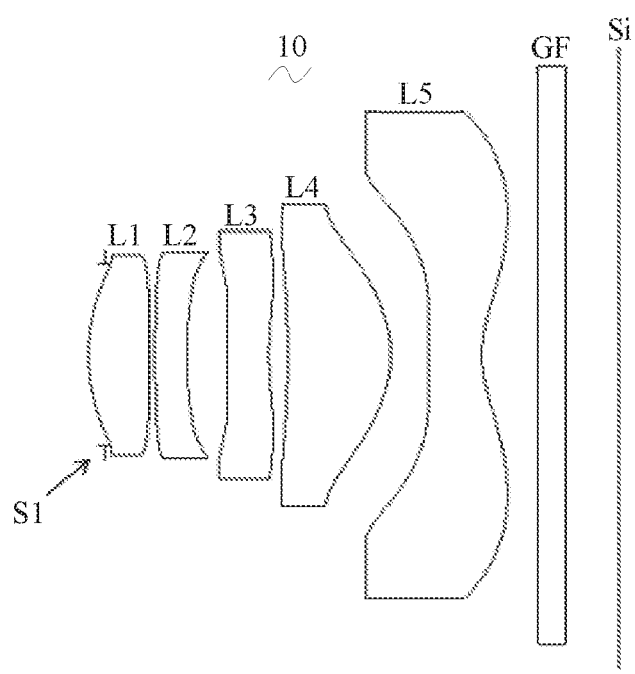
FIG. 1 is a schematic diagram of a structure of a camera optical lens according to Embodiment 1 of the present disclosure.

Referring to the accompanying drawings, the present disclosure provides a camera optical lens 10. FIG. 1 shows the camera optical lens 10 of Embodiment 1 of the present disclosure, and the camera optical lens 10 includes five lenses. Specifically, the camera optical lens 10 includes, from an object side to an image side: an aperture S1, a first lens L1, a second lens L2, a third lens L3, a fourth lens L4 and a fifth lens L5. In this embodiment, preferably, such optical element as a glass plate GF is arranged between the fifth lens L5 and an image surface Si. Herein, the glass plate GF may either be a glass cover plate or an optical filter. It is natural that in another possible embodiment, the glass plate GF may further be arranged at another position.

In this embodiment, the first lens L1 has a positive refractive power, which may effectively reduce a length of the lens, an object-side surface of the first lens L1 protrudes to be convex and an image-side surface of the first lens L1 is concave; the second lens L2 has a negative refractive power, an object-side surface of the second lens L2 is convex, and an image-side surface of the second lens L2 is concave; the third lens L3 has a negative refractive power, an object-side surface of the third lens L3 is convex, and an image-side surface of the third lens L3 is concave; the fourth lens L4 has a positive refractive power, an object-side surface of the fourth lens L4 is concave, and an image-side surface of the fourth lens L4 is convex; and the fifth lens L5 has a negative refractive power, an object-side surface of the fifth lens L5 is convex, and an image-side surface of the fifth lens L3 is concave.

In this embodiment, the first lens L1, the second lens L2, the third lens L3, the fourth lens L4 and the fifth lens L5 are all made of plastic material, which may effectively reduce cost of production.

Further, a surface of a lens may be arranged to be an aspherical surface which is easy to be made into a shape beyond a spherical surface to acquire more controlled variables to reduce aberration and to further reduce the number of lenses to be used, thereby effectively reducing a total length of the cameral optical length in the present disclosure.

In embodiments of the present disclosure, an object-side surface and image-side surface of each lens is an aspherical surface.

Herein, a unit of a focal length is denoted by mm, f denotes a focal length of the camera optical lens, f1 denotes a focal length of the first lens, f4 denotes a focal length of the fourth lens, R9 denotes a curvature radius of an object-side surface of the fifth lens, and R10 denotes a curvature radius of an image-side surface of the fifth lens. The f, f1, f4, R9 and R10 satisfy the following conditions:

$$1.00 \leq f1/f \leq 1.10 \quad (1)$$

$$0.40 \leq f4/f \leq 0.60 \quad (2)$$

$$11.00 \leq R9/R10 \leq 12.00 \quad (3)$$

Herein, condition (1) defines a ratio of the first lens L1 and the entire camera optical lens 10. Through this arrangement, the focal length of the first lens L1 may be effectively distributed so as to correct the aberration of the optical system to further improve imaging quality.

Condition (2) defines a ratio of the fourth lens L4 and the entire camera optical lens 10. This arrangement is advantageous for improving performance of the optical system within the range of the condition.

Condition (3) defines a shape of the fifth lens L5. This arrangement may effectively correct aberration generated by the first lens L1, the second lens L2, the third lens L3 and the third lens L4 of the optical system.

In this embodiment, through the above-described configuration manner of the above-described lens, and by using lenses (L1, L2, L3, L4 and L5) of different refractive powers, the first lens L1 and the entire optical lens 10 that are in a specific configuration relationship in focal length, and the fourth lens L4 that has a specific cooperative relationship with the entire optical lens 10 in focal length and the fifth lens L5 that has a particular shape, it is advantageous for distributing focal lengths of the first lens L1, the fourth lens L4 and the fifth lens L5, which helps to correct aberration of the optical system, so that the optical system both has good optical performance and meets a design requirement of big aperture, ultra-thinness and wide angle.

Specifically, in this embodiment, the second lens L2 has a negative refractive power, a curvature radius of the object-side surface of the second lens L2 is R3 and a curvature radius of the image-side surface of the second lens L2 is R4. The R3 and R4 satisfy the following condition:

$$1.55 \leq R3/R4 \leq 1.70 \quad (4)$$

Condition (4) defines a shape of the second lens L2. This arrangement, when R3 and R4 are within the range defined by the condition, may ease a deflection extent of a light that passes through a lens, thereby effectively reduce the aberration.

It is worth mentioning that since the first lens L1, the second lens L2, the third lens L3, the fourth lens L4 and the fifth lens L5 that configure the camera optical lens 10 in this embodiment have a configuration and parameter relationship as described above, the camera optical lens 10 may reasonably distribute focal lengths, shapes, materials and on-axis thicknesses of the lenses, thereby correcting aberrations of different types. In this invention, an optical imaging system of the camera optical lens 10 satisfies Fno≤2.2, a total optical length of the camera optical lens 10 is TTL, and an image height of the camera optical lens 10 is IH, satisfying the following condition: TTL/IH≤1.65; a field of view of the camera optical lens 10 is FOV, satisfying the following condition: FOV≥76°. In this way, the camera optical lens both has good optical performance and meets a design requirement of big aperture, ultra-thinness and wide angle.

FIG. 1 is a schematic diagram of a structure of a camera optical lens 10 according to Embodiment 1 of the present disclosure. In the following, design data of the camera optical lens 10 in Embodiment 1 of the present invention are shown.

Table 1 lists curvature radiuses R of object sides and image sides, on-axis thicknesses of lenses, distances d between lenses, refractive indices nd and abbe numbers vd of the first lens L1 to the fifth lens L5 of the camera optical lens 10 in Embodiment 1 of the present invention. Table 2 shows a conic coefficient k and an aspherical coefficient of the camera optical lens 10. It shall be noted that in this embodiment, a unit of distance, a radius and a central thickness is mm.

TABLE 1

| | R | d | | nd | | vd |
|---|---|---|---|---|---|---|
| S1 | ∞ | d0 = | −0.119 | | | |
| R1 | 1.497 | d1 = | 0.464 | nd1 | 1.5439 | v1 | 55.95 |
| R2 | 8.291 | d2 = | 0.043 | | | |
| R3 | 4.633 | d3 = | 0.244 | nd2 | 1.6510 | v2 | 21.49 |
| R4 | 2.756 | d4 = | 0.305 | | | |
| R5 | 3.927 | d5 = | 0.327 | nd3 | 1.6510 | v3 | 21.49 |
| R6 | 2.473 | d6 = | 0.144 | | | |
| R7 | −6.851 | d7 = | 0.790 | nd4 | 1.5439 | v4 | 55.95 |
| R8 | −0.921 | d8 = | 0.288 | | | |
| R9 | 10.220 | d9 = | 0.409 | nd5 | 1.5352 | v5 | 56.12 |
| R10 | 0.928 | d10 = | 0.430 | | | |
| R11 | ∞ | d11 = | 0.210 | ndg | 1.5168 | vg | 64.17 |
| R12 | ∞ | d12 = | 0.407 | | | |

In the table, meanings of various symbols will be described as follows.

R: curvature radius of an optical surface;

S1: aperture;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the glass plate GF;

R12: curvature radius of the image-side surface of the glass plate GF;

d: on-axis thickness of a lens or an on-axis distance between neighboring lenses;

d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the glass plate GF;
d11: on-axis thickness of the glass plate GF;
d12: on-axis distance from the image-side surface of the glass plate GF to an image surface Si;
nd: refractive index of the d line;
nd1: refractive index of the first lens L1;
nd2: refractive index of the second lens L2;
nd3: refractive index of the third lens L3;
nd4: refractive index of the fourth lens L4;
nd5: refractive index of the fifth lens L5;
ndg: refractive index of the glass plate GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

TABLE 2

| | Conic coefficient | Aspheric surface coefficients | | |
|---|---|---|---|---|
| | k | A4 | A6 | A8 |
| R1 | −2.23129E−02 | −1.03194E−02 | −2.06620E−02 | −6.93726E−01 |
| R2 | −8.58503E+01 | −5.62879E−01 | 1.31593E+00 | 1.63951E+00 |
| R3 | 9.61592E+00 | −6.52941E−01 | 1.68509E+00 | 2.61717E+00 |
| R4 | 9.19844E−01 | −2.95605E−01 | 4.33726E−01 | 3.67286E+00 |
| R5 | 5.90693E−01 | −5.25082E−01 | 4.15099E−01 | −1.73689E+00 |
| R6 | 4.31478E+00 | −3.63203E−01 | −1.63326E−01 | 8.70973E−01 |
| R7 | 1.21539E+01 | 1.29380E−01 | −5.42972E−01 | 1.09461E+00 |
| R8 | −4.90461E+00 | −3.26853E−01 | 5.17937E−01 | −7.89712E−01 |
| R9 | −3.98543E+01 | −3.31524E−01 | 6.19532E−02 | 1.88770E−01 |
| R10 | −5.04832E+00 | −2.32147E−01 | 1.74460E−01 | −9.31801E−02 |

| | Aspheric surface coefficients | | | |
|---|---|---|---|---|
| | A10 | A12 | A14 | A16 |
| R1 | 2.83280E+00 | −4.64274E+00 | 1.69424E+00 | 9.35154E−01 |
| R2 | −1.31420E+01 | 1.98531E+01 | −1.04284E+01 | 1.17706E+00 |
| R3 | −1.74623E+01 | 2.56712E+01 | −1.16218E+01 | −5.36318E−01 |
| R4 | −1.45075E+01 | 2.12329E+01 | −1.11985E+01 | 3.41155E−01 |
| R5 | 8.42999E+00 | −2.03172E+01 | 2.42869E+01 | −1.11642E+01 |
| R6 | −1.14249E+00 | 4.07853E+00 | 4.15445E−01 | −3.15594E−01 |
| R7 | −1.13757E+00 | 6.38098E−01 | −1.40127E−01 | −1.07748E−02 |
| R8 | 9.59166E−01 | −7.19451E−01 | 3.11897E−01 | −5.84683E−02 |
| R9 | −2.23274E−01 | 1.01870E−01 | −1.70228E−02 | 2.62143E−04 |
| R10 | 3.12332E−02 | −6.37483E−03 | 7.18408E−04 | −3.38726E−05 |

Here, K is a conic coefficient, and A4, A6, A8, A10, A12, A14, and A16 are aspheric surface coefficients.

It shall be noted that preferably, aspheric surfaces of the lenses in this embodiment are aspheric surfaces as shown in the following condition. However, the following condition (5) is only an example. Actually, the present disclosure is not limited to the aspheric polynome as shown in condition (5):

$$Y=(x^2/R)/\{1+[1-(1+k)(x^2/R^2)]1/2\}+A4x4+A6x6+A8x8+A10x10+A12x12+A14x14+A16\times16 \quad (5)$$

Table 3 and Table 4 show design data of inflexion points and arrest points of lenses of the camera optical lens 10 according to this embodiment of the present disclosure. Herein, P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, and P5R1 and P5R2 represent the object-side surface and the image-side surface of the fifth lens L5. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 1 | 0.655 | | |
| P1R2 | 2 | 0.145 | 0.785 | |
| P2R1 | 2 | 0.205 | 0.335 | |
| P2R2 | | | | |
| P3R1 | 3 | 0.215 | 0.725 | 0.835 |
| P3R2 | 3 | 0.325 | 0.855 | 0.945 |
| P4R1 | 2 | 0.715 | 1.015 | |
| P4R2 | 1 | 0.865 | | |
| P5R1 | 2 | 0.165 | 1.225 | |
| P5R2 | 1 | 0.455 | | |

TABLE 4

| | Number(s) of arrest points | Arrest point position 1 |
|---|---|---|
| P1R1 | | |
| P1R2 | 1 | 0.265 |
| P2R1 | | |
| P2R2 | | |
| P3R1 | 1 | 0.365 |
| P3R2 | 1 | 0.615 |
| P4R1 | | |
| P4R2 | 1 | 1.195 |
| P5R1 | 1 | 0.275 |
| P5R2 | 1 | 1.105 |

Further, in the following table 17, values corresponding to parameters defined in the various parameters and conditions in Embodiment 1 are listed.

Figure 2:
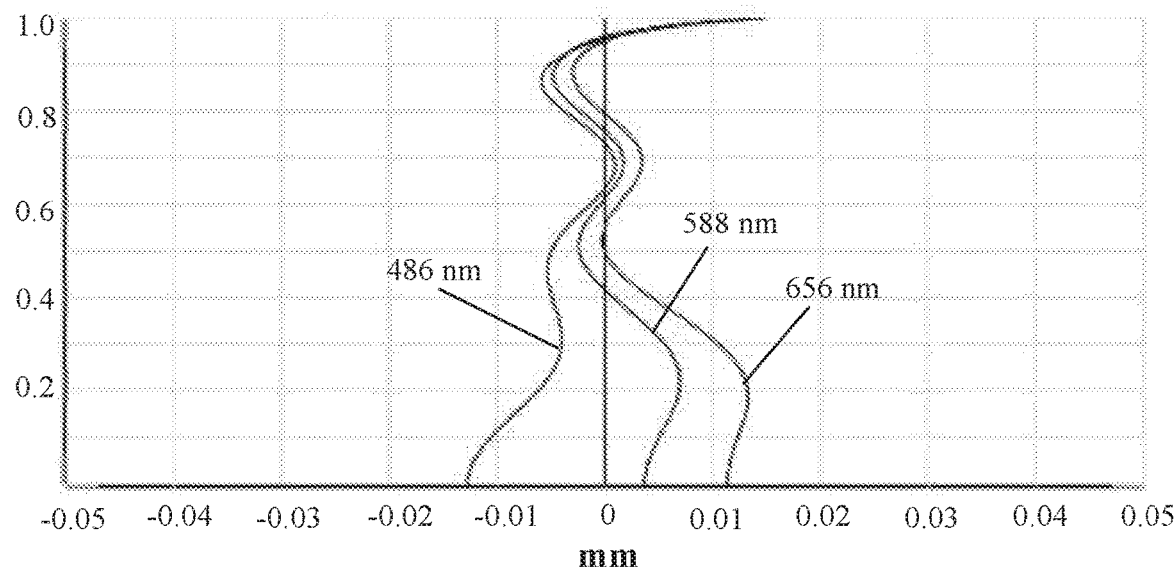
FIG. 2 is a schematic diagram of a longitudinal aberration of the camera optical lens shown in FIG. 1.
Figure 3:
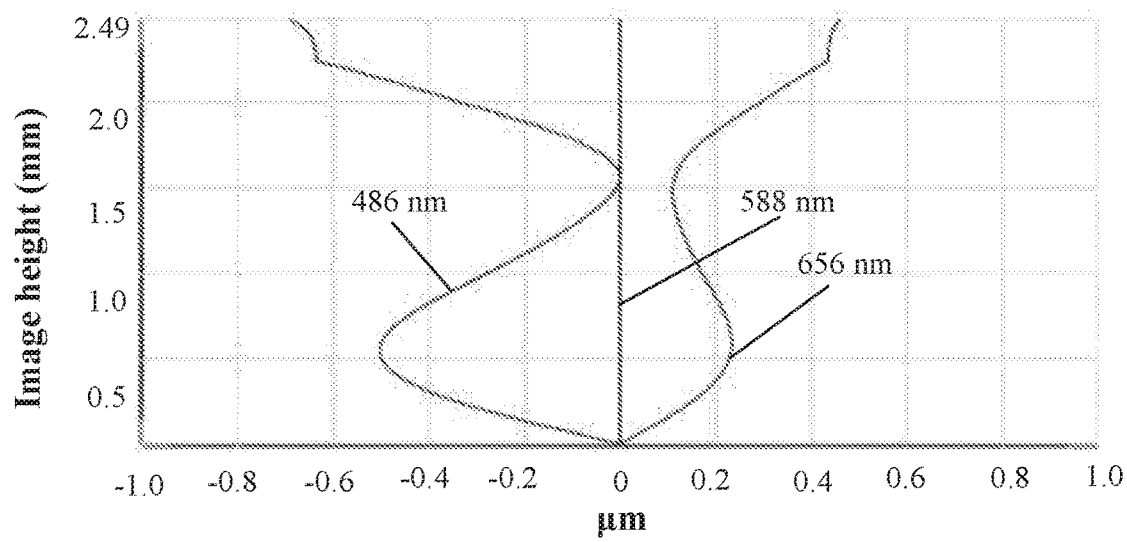
FIG. 3 is a schematic diagram of a lateral color of the camera optical lens shown in FIG. 1.
Figure 4:
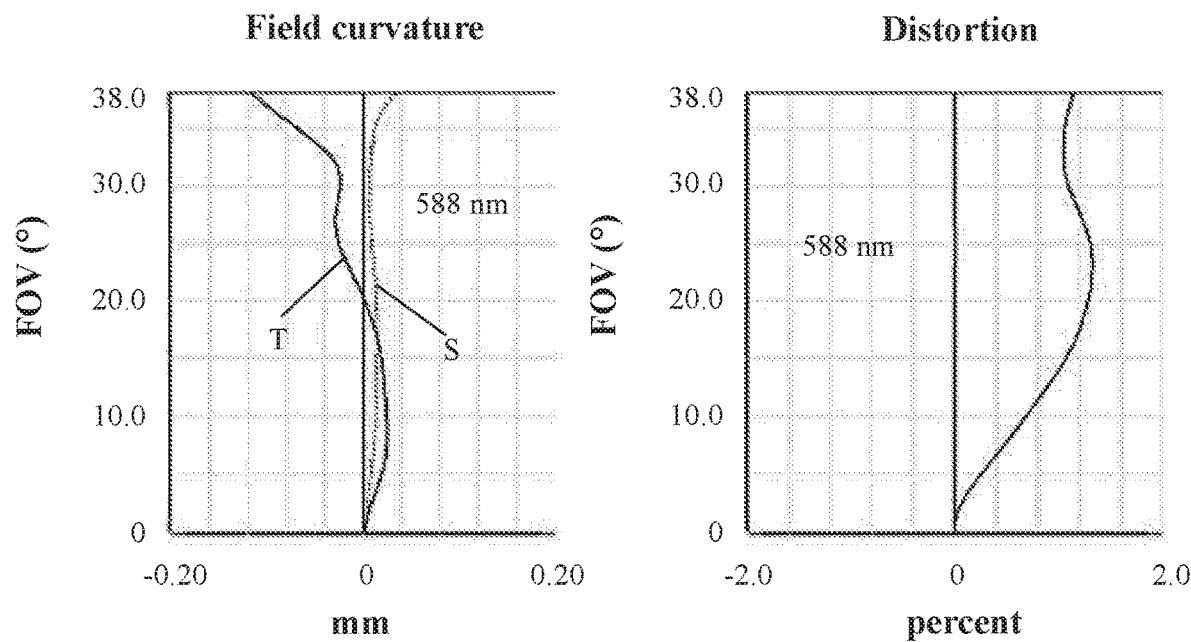
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 486 nm, 588 nm and 656 nm after passing the camera optical lens 10 according to Embodiment 1, respectively. FIG. 4 illustrates a field curvature and a distortion of light with a wavelength of 588 nm after passing the camera optical lens 10 according to Embodiment 1. A field curvature S in FIG. 4 is a field curvature in a sagittal direction, and T is a field curvature in a meridian direction.

In this embodiment, a full angle of the camera optical lens 10 is 2ω, an F value thereof is Fno. Herein, 2ω=76.0°, Fno=2.2. Thus, the camera optical lens 10 has a big aperture, is ultra-thin and wide-angled and has excellent imaging performance.

Embodiment 2

Figure 5:
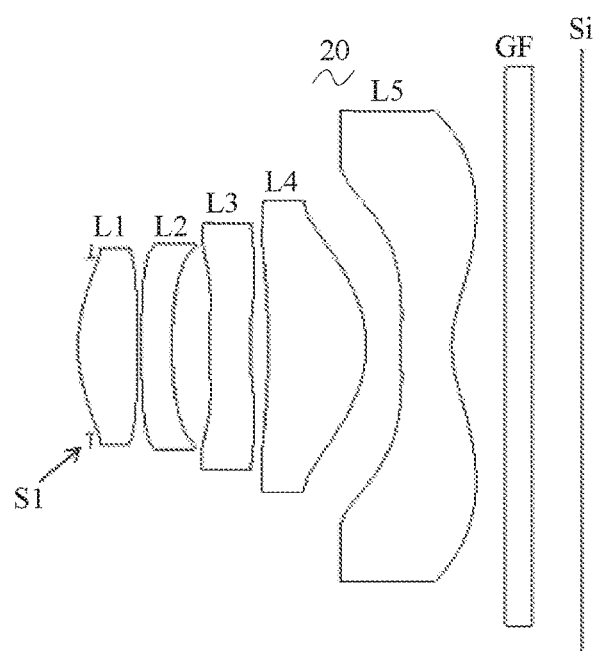
FIG. 5 is a schematic diagram of a structure of a camera optical lens according to Embodiment 2 of the present disclosure.

FIG. 5 is a schematic diagram of a structure of a camera optical lens 20 according to Embodiment 2 of the present disclosure. Embodiment 2 is basically the same as the Embodiment 1 and involves symbols having the same meanings as Embodiment 1, and only differences therebetween will be described in the following.

Table 5 and Table 6 show design data of a camera optical lens 20 in Embodiment 2 of the present disclosure. It shall be noted that in this embodiment, the unit of distance, radius and central thickness is mm.

TABLE 5

|  | R | d |  | nd |  | vd |
|---|---|---|---|---|---|---|
| S1 | ∞ | d0 = | −0.098 |  |  |  |
| R1 | 1.473 | d1 = | 0.464 | nd1 | 1.5439 | v1 | 55.95 |
| R2 | 8.436 | d2 = | 0.042 |  |  |  |
| R3 | 4.642 | d3 = | 0.241 | nd2 | 1.6510 | v2 | 21.49 |
| R4 | 2.749 | d4 = | 0.302 |  |  |  |
| R5 | 3.986 | d5 = | 0.325 | nd3 | 1.6510 | v3 | 21.49 |
| R6 | 2.462 | d6 = | 0.143 |  |  |  |
| R7 | −6.655 | d7 = | 0.792 | nd4 | 1.5439 | v4 | 55.95 |
| R8 | −0.921 | d8 = | 0.278 |  |  |  |
| R9 | 11.158 | d9 = | 0.405 | nd5 | 1.5352 | v5 | 56.12 |
| R10 | 0.934 | d10 = | 0.430 |  |  |  |
| R11 | ∞ | d11 = | 0.210 | ndg | 1.5168 | vg | 64.17 |
| R12 | ∞ | d12 = | 0.405 |  |  |  |

TABLE 6

| | Conic coefficient | Aspheric surface coefficients | | |
|---|---|---|---|---|
| | k | A4 | A6 | A8 |
| R1 | −8.06999E−02 | −1.18139E−02 | −5.12626E−02 | −7.45325E−01 |
| R2 | −8.63849E+01 | −5.84986E−01 | 1.27161E+00 | 1.65782E+00 |
| R3 | 1.23834E+01 | −6.46790E−01 | 1.72407E+00 | 2.62777E+00 |
| R4 | 2.67483E+00 | −2.84846E−01 | 5.13854E−01 | 3.66216E+00 |
| R5 | 9.99699E−01 | −5.24335E−01 | 4.16128E−01 | −1.73417E+00 |
| R6 | 4.30932E+00 | −3.63329E−01 | −1.63441E−01 | 8.70858E−01 |
| R7 | 1.27695E+01 | 1.28999E−01 | −5.43216E−01 | 1.09455E+00 |
| R8 | −4.89947E+00 | −3.27037E−01 | 5.17749E−01 | −7.89793E−01 |
| R9 | −3.58273E+01 | −3.31360E−01 | 6.19761E−02 | 1.88790E−01 |
| R10 | −5.08263E+00 | −2.31991E−01 | 1.74470E−01 | −9.31793E−02 |

| | Aspheric surface coefficients | | | |
|---|---|---|---|---|
| | A10 | A12 | A14 | A16 |
| R1 | 2.83689E+00 | −4.57885E+00 | 1.77612E+00 | 9.65210E−01 |
| R2 | −1.30477E+01 | 1.99980E+01 | −1.03933E+01 | 8.90177E−01 |
| R3 | −1.74132E+01 | 2.57302E+01 | −1.15974E+01 | −8.28581E−01 |
| R4 | −1.45646E+01 | 2.12310E+01 | −1.12087E+01 | 2.51782E−01 |
| R5 | 8.44124E+00 | −2.02801E+01 | 2.43445E+01 | −1.13781E+01 |
| R6 | −1.14236E+00 | 4.07316E−01 | 4.13502E−01 | −3.16156E−01 |
| R7 | −1.13765E+00 | 6.38138E−01 | −1.39899E−01 | −1.08097E−02 |
| R8 | 9.59046E−01 | −7.19521E−01 | 3.11842E−01 | −5.85370E−02 |
| R9 | −2.23255E−01 | 1.01876E−01 | −1.70225E−02 | 2.59219E−04 |
| R10 | 3.12317E−02 | −6.37504E−03 | 7.18275E−04 | −3.39039E−05 |

Table 7 and table 8 show design data of inflexion points and arrest points of each lens of the camera optical lens 20 lens according to this embodiment of the present disclosure.

TABLE 7

| | Number(s) of inflexion points | Inflexion point position 1 | Inflexion point position 2 | Inflexion point position 3 |
|---|---|---|---|---|
| P1R1 | 1 | 0.635 | | |
| P1R2 | 2 | 0.135 | 0.765 | |
| P2R1 | 2 | 0.205 | 0.325 | |
| P2R2 | | | | |
| P3R1 | 3 | 0.215 | 0.725 | 0.815 |
| P3R2 | 3 | 0.335 | 0.855 | 0.935 |
| P4R1 | 2 | 0.725 | 1.015 | |
| P4R2 | 1 | 0.865 | | |
| P5R1 | 2 | 0.155 | 1.225 | |
| P5R2 | 1 | 0.455 | | |

TABLE 8

| | Number of arrest points | Arrest point position 1 |
|---|---|---|
| P1R1 | | |
| P1R2 | 1 | 0.245 |
| P2R1 | | |
| P2R2 | | |
| P3R1 | 1 | 0.365 |
| P3R2 | 1 | 0.615 |
| P4R1 | | |
| P4R2 | | |
| P5R1 | 1 | 0.265 |
| P5R2 | 1 | 1.105 |

Further, in the following table 17, values corresponding to parameters defined in the various parameters and conditions in Embodiment 2 are listed.

Figure 6:
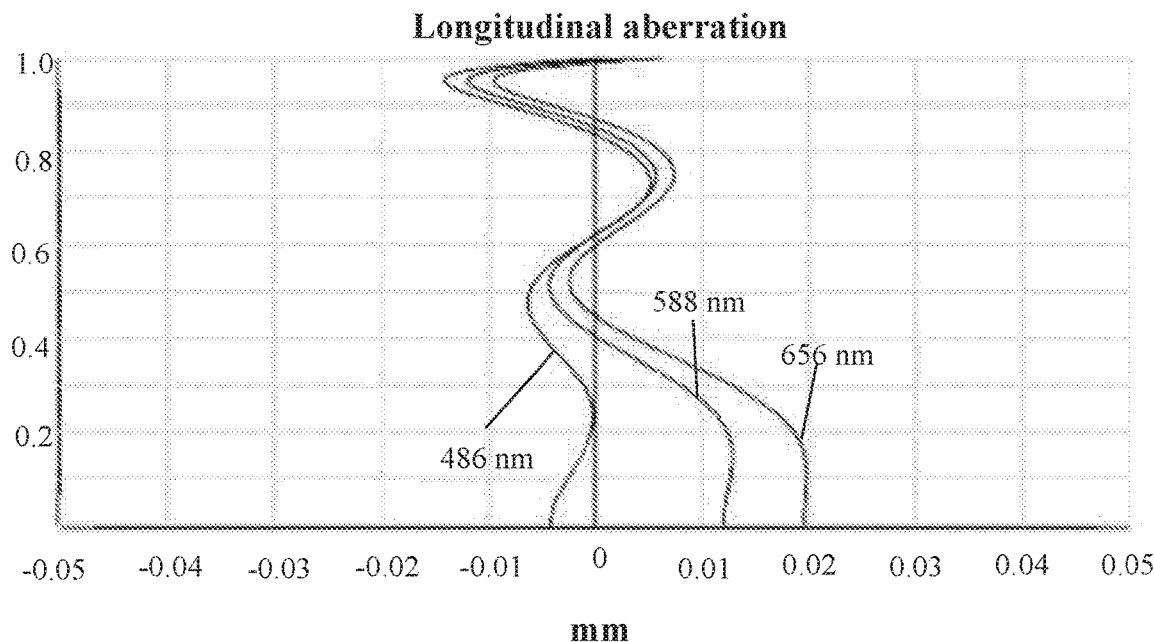
FIG. 6 is a schematic diagram of a longitudinal aberration of the camera optical lens shown in FIG. 5.
Figure 7:
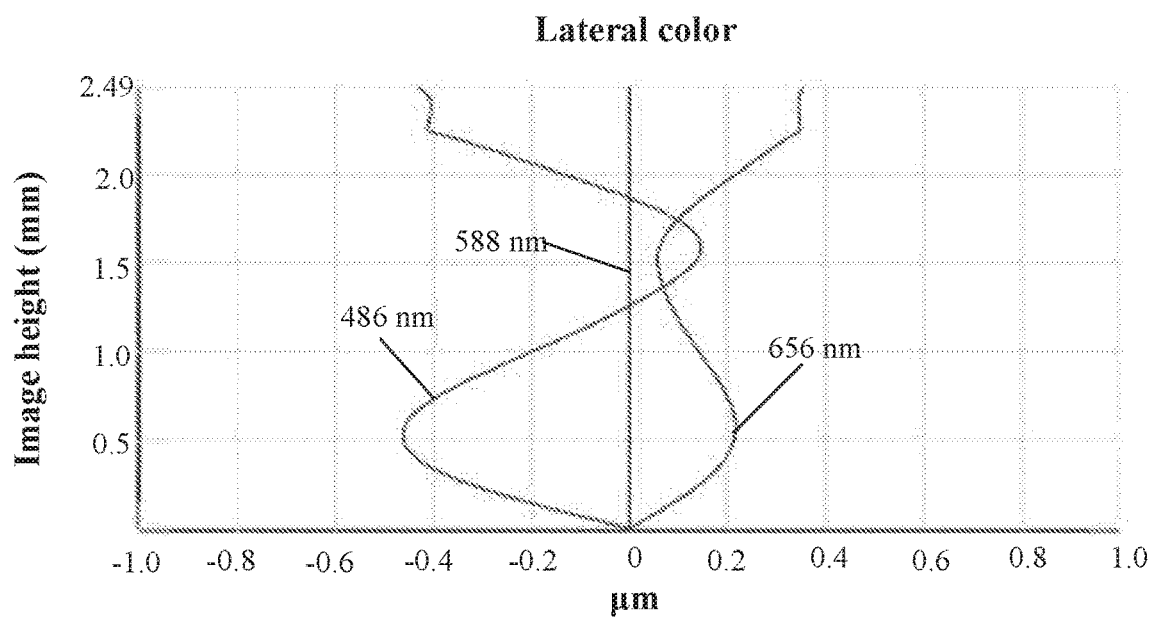
FIG. 7 is a schematic diagram of a lateral color of the camera optical lens shown in FIG. 5.
Figure 8:
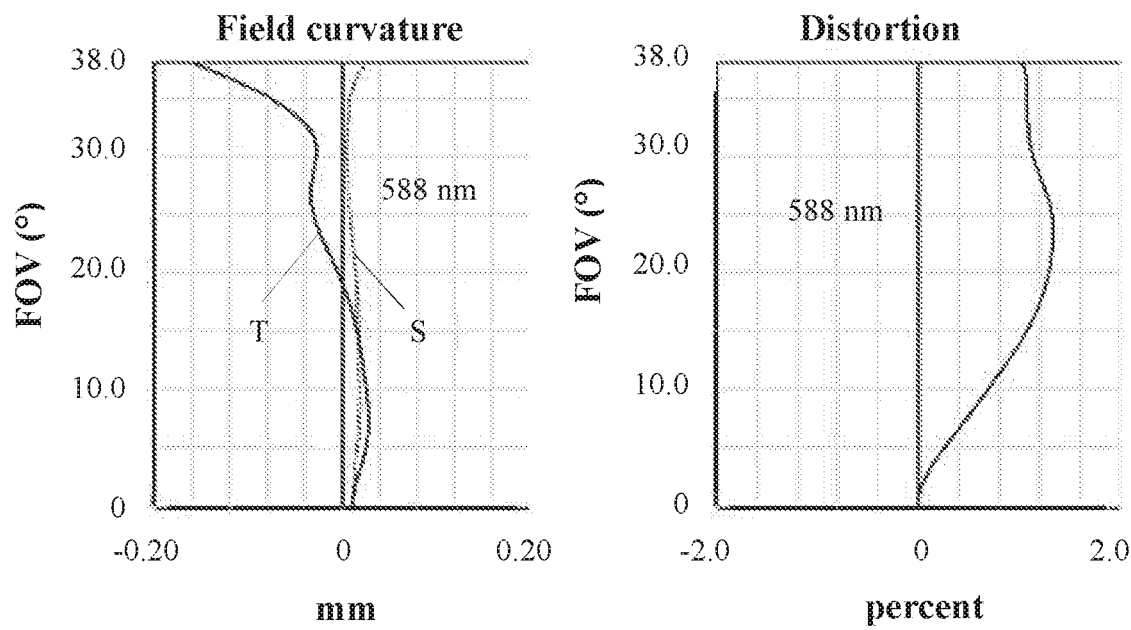
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 486 nm, 588 nm and 656 nm after passing the camera optical lens 10 according to Embodiment 2, respectively. FIG. 8 illustrates a field curvature and a distortion of light with a wavelength of 588 nm after passing the camera optical lens 20 according to Embodiment 2. A field curvature S in FIG. 8 is a field curvature in a sagittal direction, and T is a field curvature in a meridian direction.

In the camera optical lens 20 in this embodiment, 2ω=76.0° and Fno=2.2. Thus, the camera optical lens 20 has a big aperture, is ultra-thin and wide-angled and has excellent imaging performance.

Embodiment 3

Figure 9:
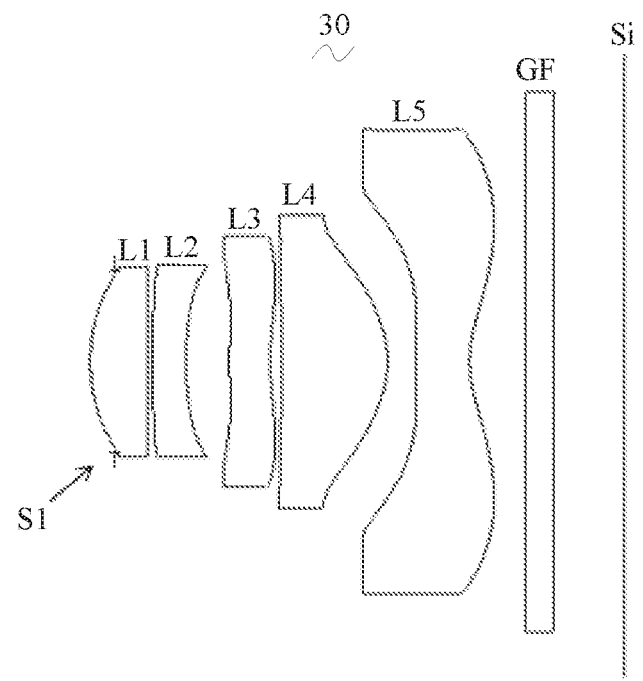
FIG. 9 is a schematic diagram of a structure of a camera optical lens according to Embodiment 3 of the present disclosure.

FIG. 9 is a schematic diagram of a structure of a camera optical lens 30 according to Embodiment 3 of the present disclosure. Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure. It shall be noted that in this embodiment, the unit of distance, radius and central thickness is mm.

TABLE 9

| | R | d | | nd | | vd |
|---|---|---|---|---|---|---|
| S1 | ∞ | d0 = | −0.187 | | | |
| R1 | 1.399 | d1 = | 0.437 | nd1 | 1.5439 | v1 | 55.95 |
| R2 | 4.834 | d2 = | 0.036 | | | |
| R3 | 3.445 | d3 = | 0.259 | nd2 | 1.6510 | v2 | 21.49 |
| R4 | 2.174 | d4 = | 0.337 | | | |
| R5 | 4.856 | d5 = | 0.315 | nd3 | 1.6510 | v3 | 21.49 |

TABLE 9-continued

| | R | d | | nd | | vd |
|---|---|---|---|---|---|---|
| R6 | 2.383 | d6 = | 0.082 | | | |
| R7 | −31.768 | d7 = | 0.817 | nd4 1.5439 | v4 | 55.95 |
| R8 | −0.861 | d8 = | 0.222 | | | |
| R9 | 11.130 | d9 = | 0.409 | nd5 1.5352 | v5 | 56.12 |
| R10 | 0.928 | d10 = | 0.430 | | | |
| R11 | ∞ | d11 = | 0.210 | ndg 1.5168 | vg | 64.17 |
| R12 | ∞ | d12 = | 0.546 | | | |

TABLE 10

| | Conic coefficient | Aspherical surface coefficients | | |
|---|---|---|---|---|
| | k | A4 | A6 | A8 |
| R1 | 5.07727E−01 | 5.45652E−03 | 3.52630E−02 | −7.76817E−01 |
| R2 | −1.10982E+01 | −5.97226E−01 | 1.46759E+00 | 1.27433E+00 |
| R3 | 7.96103E−01 | −6.85438E−01 | 1.48726E+00 | 2.31745E+00 |
| R4 | 4.21121E+00 | −2.55798E−01 | 3.34950E−02 | 4.13955E+00 |
| R5 | 1.65981E+01 | −4.93767E−01 | 4.47944E−01 | −1.66343E+00 |
| R6 | 4.24802E+00 | −3.67904E−01 | −1.60569E−01 | 8.72859E−01 |
| R7 | 9.00001E+01 | 1.21325E+00 | −5.49881E−01 | 1.09217E+00 |
| R8 | −4.46799E+00 | −3.26658E−01 | 5.20654E−01 | −7.87532E−01 |
| R9 | 1.25360E+01 | −3.27621E−01 | 6.25726E−02 | 1.89001E−01 |
| R10 | −5.59661E+00 | −2.29786E−01 | 1.74788E−01 | −9.31506E−02 |

| | Aspherical surface coefficients | | | |
|---|---|---|---|---|
| | A10 | A12 | A14 | A16 |
| R1 | 2.85039E+00 | −4.28926E+00 | 1.51626E+00 | 1.03872E+00 |
| R2 | −1.31282E+01 | 2.11091E+01 | −8.23814E+00 | −2.99547E+00 |
| R3 | −1.64280E+01 | 2.65419E+01 | −1.29794E+01 | −1.19361E+00 |
| R4 | −1.43172E+01 | 2.10998E+01 | −1.19803E+01 | 4.78527E−01 |
| R5 | 8.48659E+00 | −2.05490E+01 | 2.36613E+01 | −1.03024E+01 |
| R6 | −1.14579E+00 | 3.93245E−01 | 3.87343E−01 | −3.28617E−01 |
| R7 | −1.13678E+00 | 6.39542E−01 | −1.41302E−01 | −2.32744E−02 |
| R8 | 9.60386E−01 | −7.18859E−01 | 3.12108E−01 | −5.84987E−02 |
| R9 | −2.23153E−01 | 1.01922E−01 | −1.70090E−02 | 2.62361E−04 |
| R10 | 3.12323E−02 | −6.37650E−03 | 7.17741E−04 | −3.40620E−05 |

Table 11 and Table 12 show design data of inflexion points and arrest points of the respective lenses in the camera optical lens 30 according to Embodiment 3 of the present disclosure.

TABLE 11

| | Number(s) of inflexion points | Inflexion point position 1 | Inflexion point position 2 | Inflexion point position 3 | Inflexion point position 4 |
|---|---|---|---|---|---|
| P1R1 | | | | | |
| P1R2 | 2 | 0.195 | 0.655 | | |
| P2R1 | 2 | 0.225 | 0.395 | | |
| P2R2 | | | | | |
| P3R1 | 2 | 0.205 | 0.705 | | |
| P3R2 | 1 | 0.335 | | | |
| P4R1 | 4 | 0.185 | 0.325 | 0.695 | 0.845 |
| P4R2 | 1 | 0.845 | | | |
| P5R1 | 2 | 0.155 | 1.195 | | |
| P5R2 | 1 | 0.445 | | | |

TABLE 12

| | Number of arrest points | Arrest point position 1 | Arrest point position 2 |
|---|---|---|---|
| P1R1 | | | |
| P1R2 | 2 | 0.555 | 0.705 |
| P2R1 | | | |
| P2R2 | | | |

TABLE 12-continued

| | Number of arrest points | Arrest point position 1 | Arrest point position 2 |
|---|---|---|---|
| P3R1 | 2 | 0.355 | 0.835 |
| P3R2 | 1 | 0.635 | |
| P4R1 | | | |
| P4R2 | 1 | 1.155 | |
| P5R1 | 1 | 0.265 | |
| P5R2 | 1 | 1.095 | |

In the following table 17, values corresponding to parameters defined in the various parameters and conditions in Embodiment 3 are listed.

Figure 10:
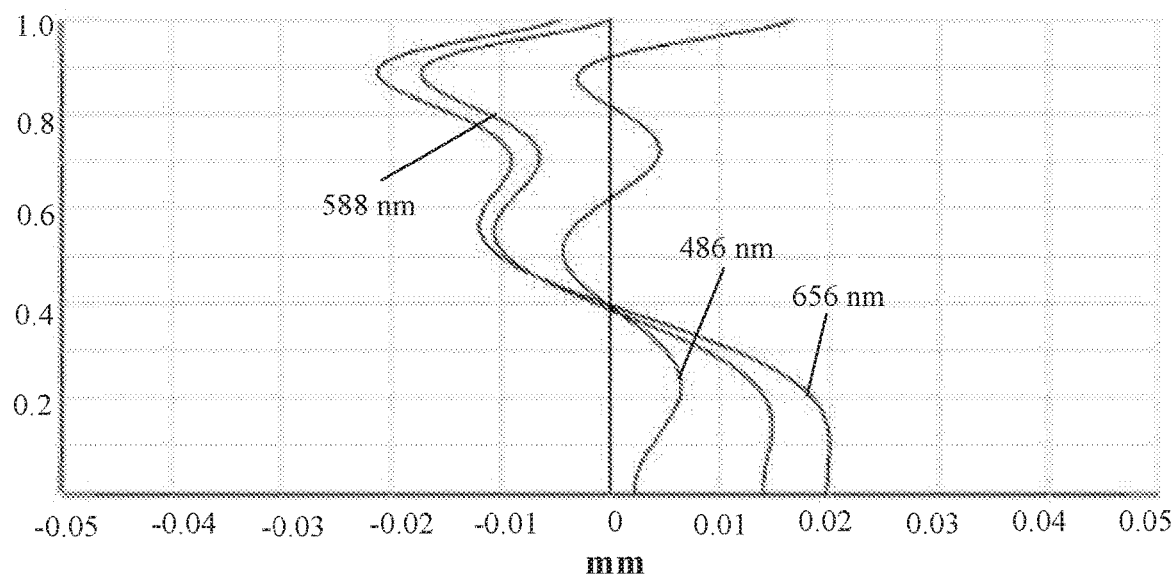
FIG. 10 is a schematic diagram of a longitudinal aberration of the camera optical lens shown in FIG. 9.
Figure 11:
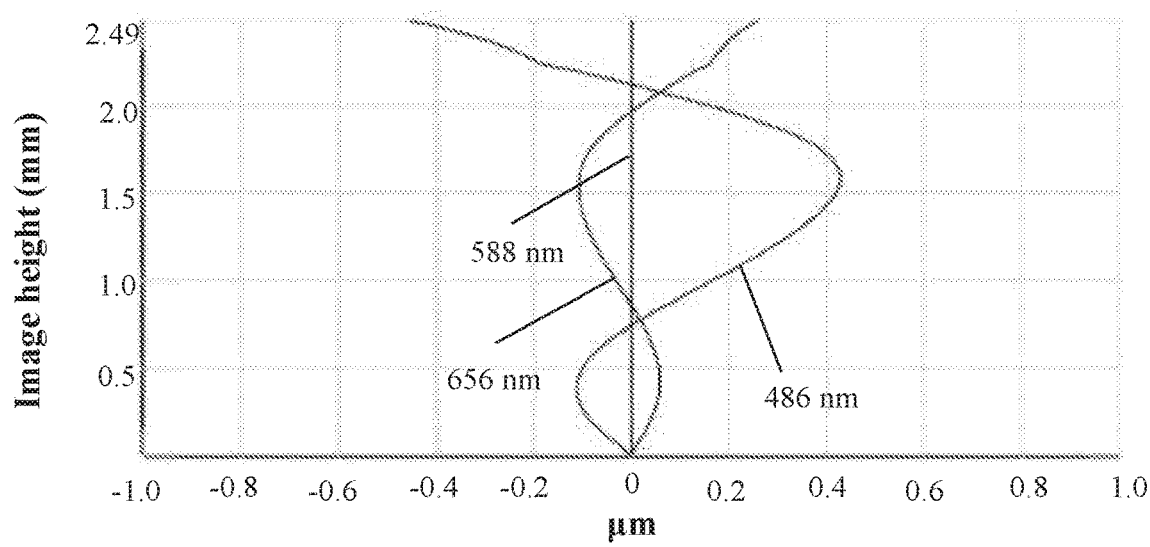
FIG. 11 is a schematic diagram of a lateral color of the camera optical lens shown in FIG. 9.
Figure 12:
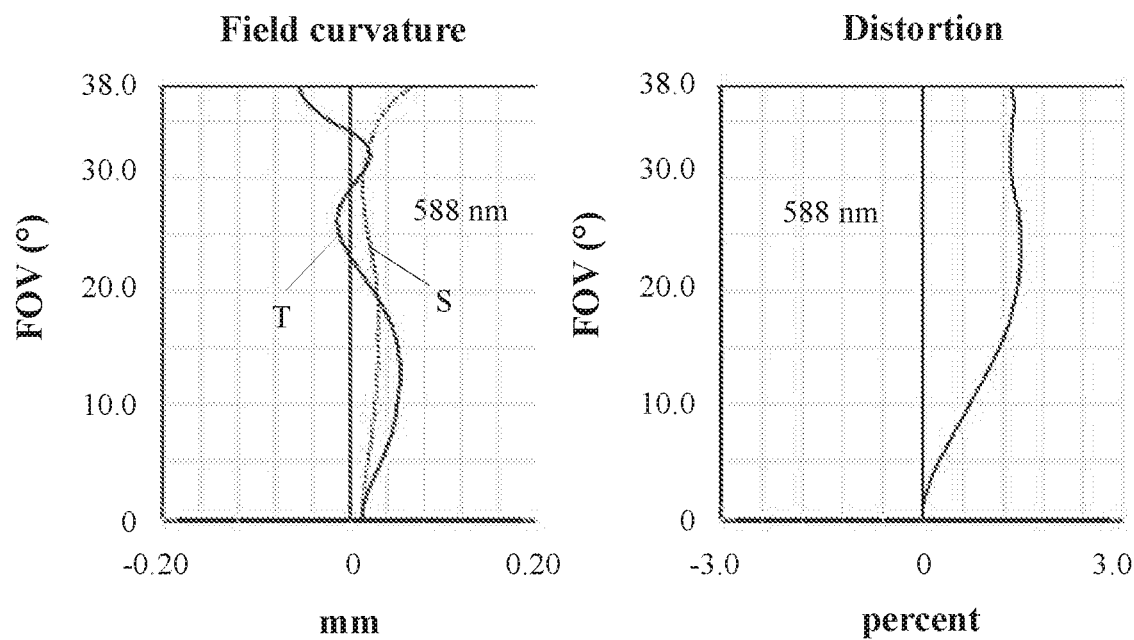
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 486 nm, 588 nm and 656 nm after passing the camera optical lens 30 according to Embodiment 3, respectively. FIG. 12 illustrates a field curvature and a distortion of light with a wavelength of 588 nm after passing the camera optical lens 30 according to Embodiment 3. A field curvature S in FIG. 12 is a field curvature in a sagittal direction, and T is a field curvature in a meridian direction.

In the camera optical lens 30 in this embodiment, 2ω=76.0° and Fno=2.2. Thus, the camera optical lens 30 has a big aperture, is ultra-thin and wide-angled and has excellent imaging performance.

Embodiment 4

Figure 13:
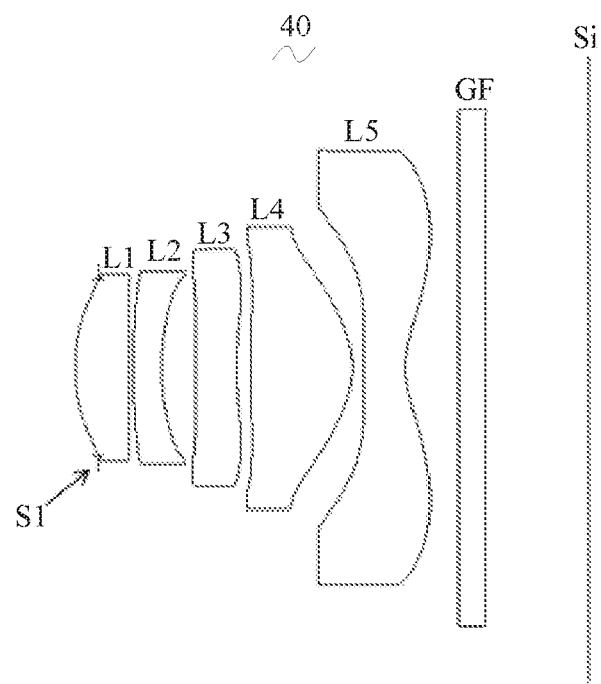
FIG. 13 is a schematic diagram of a structure of a camera optical lens according to Embodiment 4 of the present disclosure.

FIG. 13 is a schematic diagram of a structure of a camera optical lens 40 according to Embodiment 4 of the present disclosure. Embodiment 4 is basically the same as Embodiment 1 and involves symbols having the same meanings as Embodiment 1, and only differences therebetween will be described in the following.

Table 13 and Table 14 show design data of a camera optical lens 40 in Embodiment 4 of the present disclosure. It shall be noted that in this embodiment, the unit of distance, radius and central thickness is mm.

TABLE 13

| | R | d | | nd | | vd |
|---|---|---|---|---|---|---|
| S1 | ∞ | d0 = | −0.182 | | | |
| R1 | 1.429 | d1 = | 0.428 | nd1 1.5439 | v1 | 55.95 |
| R2 | 5.325 | d2 = | 0.036 | | | |
| R3 | 3.563 | d3 = | 0.230 | nd2 1.6510 | v2 | 21.49 |
| R4 | 2.107 | d4 = | 0.265 | | | |

TABLE 13-continued

| | R | d | | nd | | vd |
|---|---|---|---|---|---|---|
| R5 | 4.725 | d5 = | 0.331 | nd3 | 1.6510 | v3 | 21.49 |
| R6 | 2.376 | d6 = | 0.114 | | | |
| R7 | 25.925 | d7 = | 0.808 | nd4 | 1.5439 | v4 | 55.95 |
| R8 | −0.738 | d8 = | 0.091 | | | |
| R9 | 9.281 | d9 = | 0.330 | nd5 | 1.5352 | v5 | 56.12 |
| R10 | 0.774 | d10 = | 0.430 | | | |
| R11 | ∞ | d11 = | 0.210 | ndg | 1.5168 | vg | 64.17 |
| R12 | ∞ | d12 = | 0.827 | | | |

TABLE 14

| | Conic coefficient | Aspherical surface coefficients | | |
|---|---|---|---|---|
| | k | A4 | A6 | A8 |
| R1 | 4.85696E−01 | 4.19471E−02 | −2.05659E−02 | −7.62465E−01 |
| R2 | 3.63191E+01 | −5.61226E−01 | 1.28032E+00 | 1.64959E+00 |
| R3 | 3.64624E+00 | −6.85592E−01 | 1.70312E+00 | 2.61341E+00 |
| R4 | 3.02400E+00 | −2.76772E−01 | 4.80198E−01 | 3.63497E+00 |
| R5 | 2.09058E+01 | −4.88528E−01 | 4.68400E−01 | −1.60907E+00 |
| R6 | 4.36258E+00 | −3.70050E−01 | −1.63949E−01 | 8.67336E−01 |
| R7 | −9.00000E+01 | 1.01583E−01 | −5.62869E−01 | 1.08332E+00 |
| R8 | −4.68770E+00 | −3.19391E−01 | 5.24033E−01 | −7.86298E−01 |
| R9 | 3.74176E+00 | −3.27419E−01 | 6.27707E−02 | 1.89331E−01 |
| R10 | −6.12468E+00 | −2.27540E−01 | 1.74590E−01 | −9.32551E−02 |

| | Aspherical surface coefficients | | | |
|---|---|---|---|---|
| | A10 | A12 | A14 | A16 |
| R1 | 2.81361E+00 | −4.57210E+00 | 1.85491E+00 | 1.15050E+00 |
| R2 | −1.30579E+01 | 2.00072E+00 | −1.03387E+01 | 1.02755E+00 |
| R3 | −1.74267E+01 | 2.57184E+01 | −1.15980E+01 | −8.34303E−01 |
| R4 | −1.45954E+01 | 2.11818E+01 | −1.12991E+01 | 2.38537E−02 |
| R5 | 8.49176E+00 | −2.03671E+01 | 2.41695E+01 | −1.15860E+01 |
| R6 | −1.15777E+00 | 3.80671E−01 | 3.89324E−01 | −3.27186E−01 |
| R7 | −1.14619E+00 | 6.32621E−01 | −1.42048E−01 | −1.12563E−02 |
| R8 | 9.60246E−01 | −7.19308E−01 | 3.11685E−01 | −5.87959E−02 |
| R9 | −2.22939E−01 | 1.01986E−01 | −1.70194E−02 | 2.11454E−04 |
| R10 | 3.11858E−02 | −6.38807E−03 | 7.15349E−04 | −3.44102E−05 |

Table 15 and table 16 show design data of inflexion points and arrest points of each lens of the camera optical lens 40 lens according to this embodiment of the present disclosure.

TABLE 15

| | Number(s) of inflexion points | Inflexion point position 1 | Inflexion point position 2 | Inflexion point position 3 | Inflexion point position 4 |
|---|---|---|---|---|---|
| P1R1 | | | | | |
| P1R2 | 4 | 0.205 | 0.385 | 0.525 | 0.695 |
| P2R1 | 2 | 0.245 | 0.315 | | |
| P2R2 | 1 | 0.785 | | | |
| P3R1 | 3 | 0.205 | 0.625 | 0.785 | |
| P3R2 | 1 | 0.335 | | | |
| P4R1 | 1 | 0.395 | | | |
| P4R2 | 1 | 0.825 | | | |
| P5R1 | 2 | 0.175 | 1.195 | | |
| P5R2 | 1 | 0.415 | | | |

TABLE 16

| | Number of arrest points | Arrest point position 1 | Arrest point position 2 |
|---|---|---|---|
| P1R1 | | | |
| P1R2 | 2 | 0.625 | 0.735 |
| P2R1 | | | |
| P2R2 | | | |
| P3R1 | 1 | 0.365 | |
| P3R2 | 1 | 0.625 | |
| P4R1 | 1 | 0.595 | |
| P4R2 | 1 | 1.155 | |
| P5R1 | 1 | 0.295 | |
| P5R2 | 1 | 1.085 | |

Further, in the following table 17, values corresponding to parameters defined in the various parameters and conditions in Embodiment 4 are listed.

Figure 14:
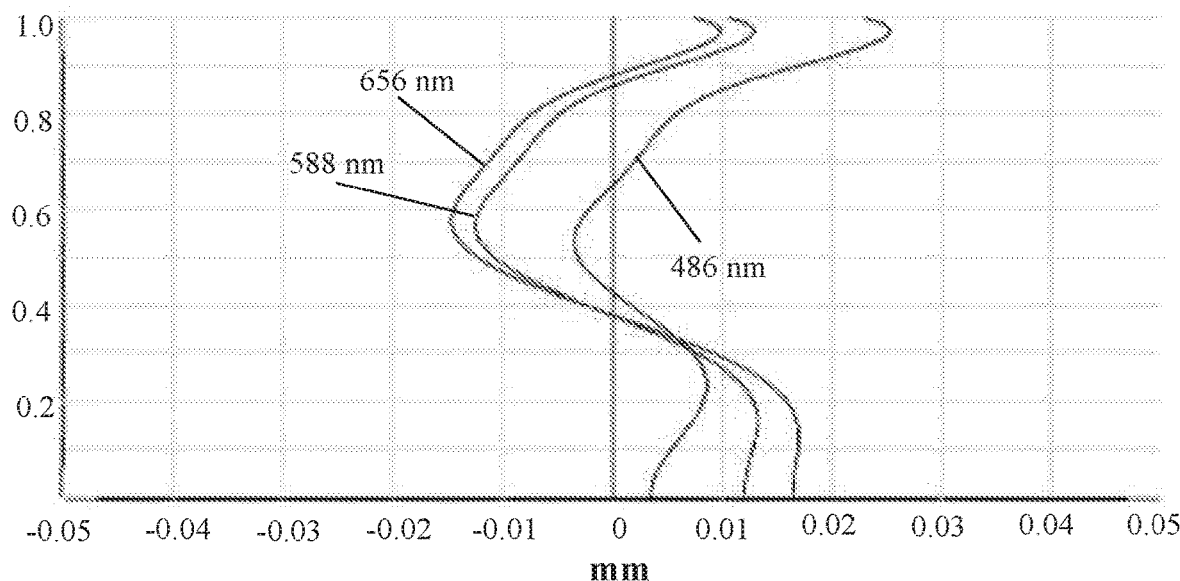
FIG. 14 is a schematic diagram of a longitudinal aberration of the camera optical lens shown in FIG. 13.
Figure 15:
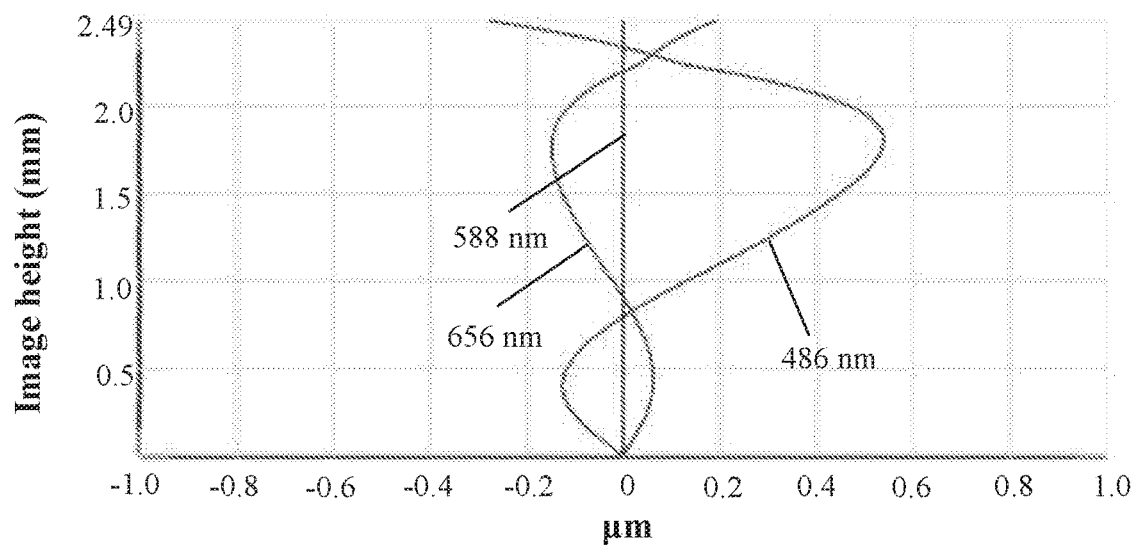
FIG. 15 is a schematic diagram of a lateral color of the camera optical lens shown in FIG. 13.
Figure 16:
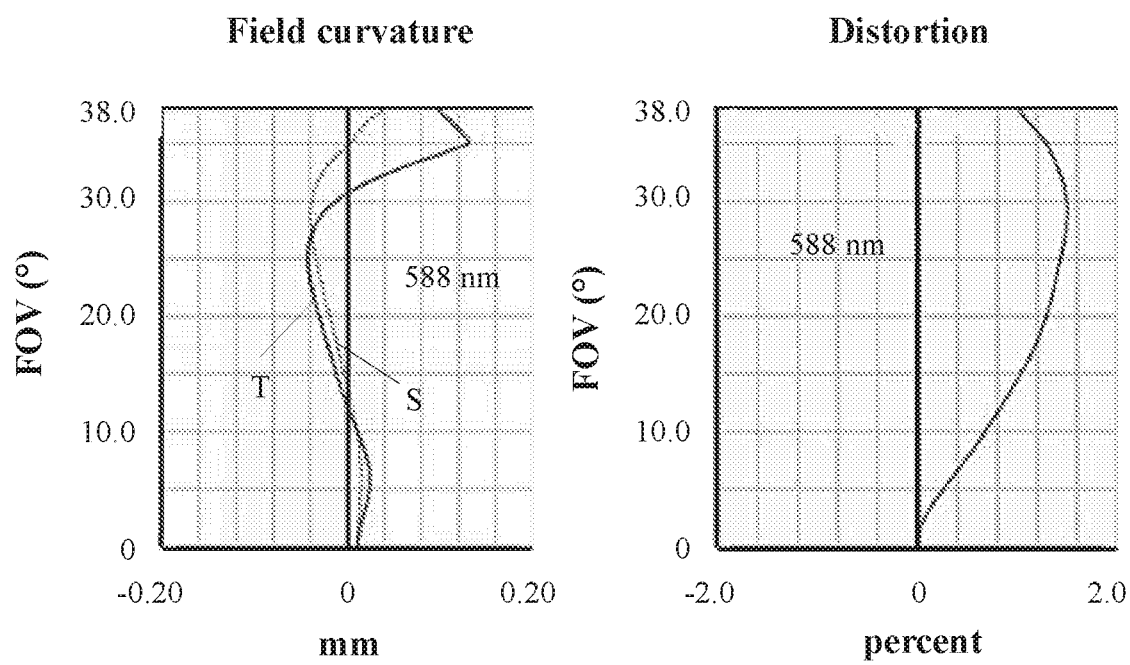
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 486 nm, 588 nm and 656 nm after passing the camera optical lens 40 according to Embodiment 4, respectively. FIG. 16 illustrates a field curvature and a distortion of light with a wavelength of 588 nm after passing the camera optical lens 40 according to Embodiment 4. A field curvature S in FIG. 16 is a field curvature in a sagittal direction, and T is a field curvature in a meridian direction.

In the camera optical lens 40 in this embodiment, $2\omega=76.0°$ and Fno=2.2. Thus, the camera optical lens 40 has a big aperture, is ultra-thin and wide-angled and has excellent imaging performance.

The following table 17 lists values of conditions (1), (2), (3) and (4) corresponding to Embodiment 1, Embodiment 2, Embodiment 3 and Embodiment 4 in accordance with the above-described conditions and values of other related parameters.

TABLE 17

|       | Embodiment 1 | Embodiment 2 | Embodiment 3 | Embodiment 4 | Note |
|-------|--------------|--------------|--------------|--------------|------|
| f1/f  | 1.04         | 1.01         | 1.10         | 1.09         | Condition (1) |
| f4/f  | 0.59         | 0.59         | 0.51         | 0.42         | Condition (2) |
| R9/R10 | 11.01       | 11.94        | 11.99        | 11.99        | Condition (3) |
| R3/R4 | 1.68         | 1.69         | 1.58         | 1.69         | Condition (4) |
| Fno   | 2.200        | 2.200        | 2.200        | 2.200        |      |
| 2ω    | 76.002       | 75.999       | 75.999       | 75.995       |      |
| f     | 3.159        | 3.172        | 3.165        | 3.171        |      |
| f1    | 3.279        | 3.205        | 3.465        | 3.457        |      |
| f2    | −11.014      | −10.903      | −9.846       | −8.441       |      |
| f3    | −11.259      | −10.797      | −7.569       | −7.771       |      |
| f4    | 1.869        | 1.874        | 1.613        | 1.333        |      |
| f5    | −1.937       | −1.932       | −1.919       | −1.599       |      |
| TTL   | 4.061        | 4.038        | 4.100        | 4.100        |      |
| LB    | 1.047        | 1.045        | 1.186        | 1.467        |      |
| IH    | 2.492        | 2.492        | 2.492        | 2.492        |      |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising, from an object side to an image side:

an aperture,
a first lens having a positive refractive power;
a second lens having a negative refractive power;
a third lens having a negative refractive power;
a fourth lens having a positive refractive power; and
a fifth lens having a negative refractive power;
wherein the camera optical lens satisfies following conditions:

$$1.00 \leq f1/f \leq 1.10;$$

$$0.40 \leq f4/f \leq 0.60; \text{ and}$$

$$11.00 \leq R9/R10 \leq 12.00;$$

where mm denotes a unit of a focal length;
f denotes a focal length of the camera optical lens;
f1 denotes a focal length of the first lens;
f4 denotes a focal length of the fourth lens;
R9 denotes a curvature radius of an object-side surface of the fifth lens; and
R10 denotes a curvature radius of an image-side surface of the fifth lens.

2. The camera optical lens according to claim 1 further satisfying following condition:

$$1.55 \leq R3/R4 \leq 1.70;$$

where
R3 denotes a curvature radius of an object-side surface of the second lens; and
R4 denotes a curvature radius of an image-side surface of the second lens.

* * * * *